United States Patent [19]
Zimmermann

[11] Patent Number: 5,342,188
[45] Date of Patent: Aug. 30, 1994

[54] DEVICE FOR CRIMPING AND CUTTING DOUGH ROPES

[75] Inventor: Craig E. Zimmermann, Waconia, Minn.

[73] Assignee: General Mills, Inc., Minneapolis, Minn.

[21] Appl. No.: 14,919

[22] Filed: Feb. 8, 1993

[51] Int. Cl.$^5$ .............................................. A21C 11/04
[52] U.S. Cl. ..................... 425/235; 264/151; 264/168; 425/236; 425/237; 425/294; 425/298; 425/385; 426/503
[58] Field of Search ............... 425/294, 298, 236, 235, 425/237, 436 R, 436 RM, 394, 408, 362, 385, 336; 264/151, 168; 426/503, 518

[56] References Cited

U.S. PATENT DOCUMENTS

| | | | |
|---|---|---|---|
| 25,775 | 10/1859 | McCollum | 425/235 |
| 32,882 | 7/1861 | Marshall | 425/235 |
| 49,515 | 8/1865 | Geilhausen | 425/237 |
| 492,206 | 2/1893 | Hunter et al. | 425/236 |
| 598,745 | 2/1898 | Perky | 425/362 |
| 2,130,887 | 9/1938 | Kremmling | 425/436 |
| 2,705,462 | 4/1955 | Reinhard | 425/236 |
| 2,867,000 | 1/1959 | Huszar | 425/298 |
| 3,188,780 | 6/1965 | Mead | 53/440 |
| 3,205,837 | 9/1965 | Fay | 425/362 |
| 4,042,443 | 8/1977 | Hoback et al. | 425/393 |
| 4,630,426 | 12/1986 | Gentry | 53/428 |
| 4,886,441 | 12/1989 | Lortz | 425/236 |

FOREIGN PATENT DOCUMENTS 2054971 5/1992 Canada .
0431203A1 6/1991 European Pat. Off. .

Primary Examiner—Jay H. Woo
Assistant Examiner—Duane S. Smith
Attorney, Agent, or Firm—John A. O'Toole; L. MeRoy Lillehaugen; Alan D. Kamrath

[57] ABSTRACT

A device (10) for crimping and cutting dough ropes into pillow-shaped longitudinal lengths is disclosed including a cutting roller (12) and an anvil roller (14). The peripheries (22, 24) of the rollers (12, 14) include a plurality of axially extending, spaced, parallel, linearly straight lands (26, 30) separating, forming, and defining a plurality of grooves (28, 32) therebetween. Compressible tubes (46) are stretched between end plates (36) located on the opposite axial ends of the cutter roller (12) and positioned in each of the grooves (32) thereof. The tubes (46) are compressed in the grooves (32) by the dough ropes as they are being crimped and cut by the abutment of the lands (26, 30) of the rollers (12, 14) together and expand and force the pillow-shaped longitudinal lengths of dough from the grooves (32) when the lands (26, 30) of the rollers (12, 14) separate. In the preferred form, the lands (26, 30) and the grooves (28, 32) of the rollers (12, 14) are offset from the axes (16, 18) of the rollers (12, 14) at a small angle in the order of 3° such that at least a portion of one of the lands (30) of the cutter roller (12) engages with a portion of one of the lands (26) of the anvil roller (14) during all times of rotation of the rollers (12, 14).

20 Claims, 4 Drawing Sheets

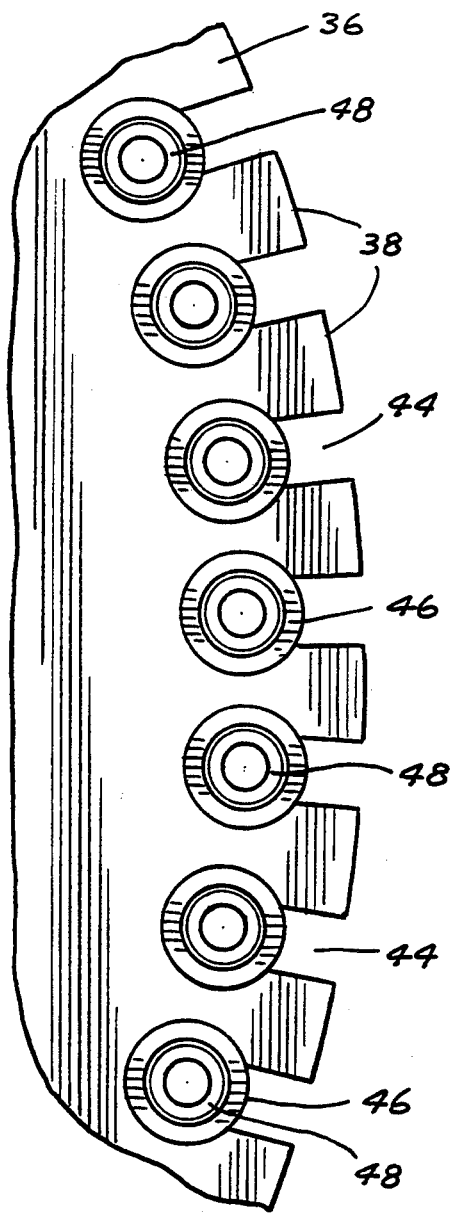
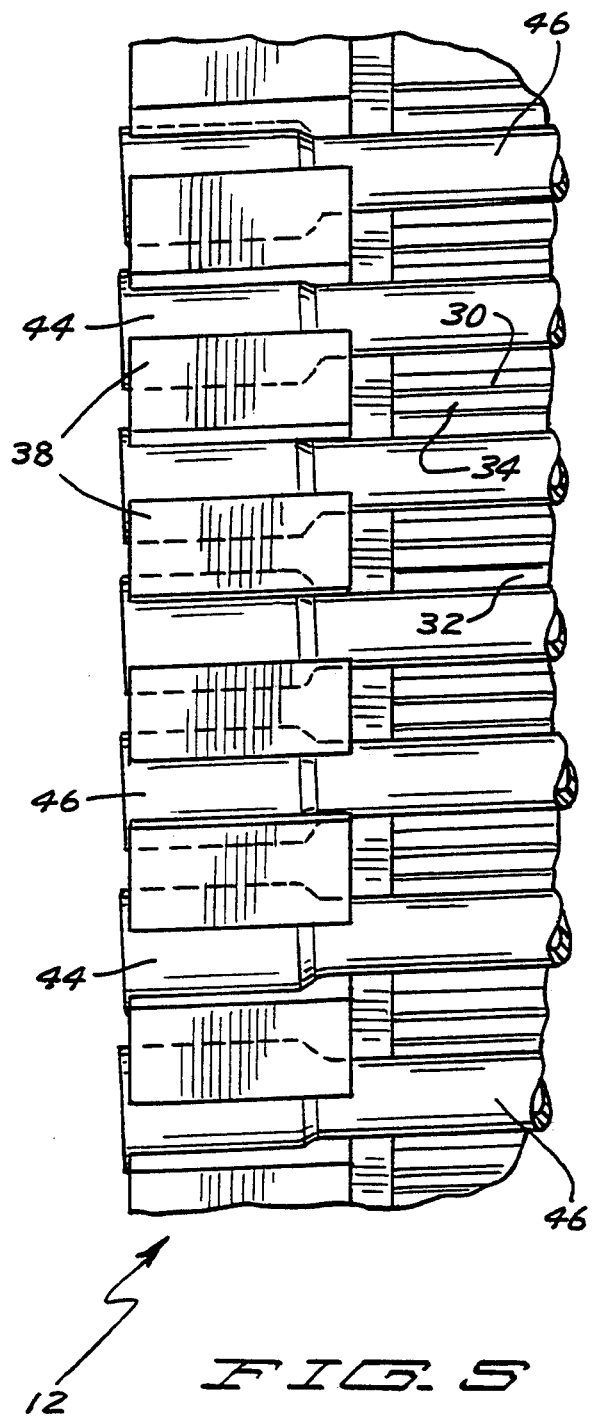
FIG. 4
FIG. 5

DEVICE FOR CRIMPING AND CUTTING DOUGH ROPES

BACKGROUND

The present invention generally relates to devices for crimping and cutting ropes of dough, particularly to crimping/cutting devices forming pillow-shaped dough pieces, more particularly to crimping/cutting devices forming pillow-shaped breakfast cereal pieces, and specifically to crimping/cutting devices forming pillow-shaped breakfast cereal pieces from ropes of dough traveling at high speeds in the order of 350 feet (100 meters) per minute.

The sale of breakfast cereals is a highly competitive business. In addition to the particular food components, color, flavor and increasingly shapes are important in the marketability of any particular breakfast cereal. For example, pillow-shaped pieces are a shape which is believed to have particular market appeal, with the pieces either being formed of a single homogeneous material or multiple materials such as a coextridite including an outer shell of a first material such as a cereal material and an inner phase of a second, filling material such as an icing.

One method of forming such pillow-shaped pieces is to crimp a rope of dough material at spaced intervals, with the pieces either being individually cut to be independent from each other or with the pieces being cut to remain in continuous ropes with easily fracturable connections. Cooker/extruders are capable of producing dough ropes at relatively high rates of speed in the order of 350 feet (100 meters) per minute, and in fact the uniformity and consistency of the dough ropes increases at high rates of production. The pieces can be produced by passing the dough ropes between counter rotating crimping/cutting rollers, with at least one of the rollers including blades which crimp/cut the rope to the desired longitudinal length of pieces. Due to the random stickiness of the dough, the crimped/cut dough pieces tend to adhere with one of the rollers after passing between the nip of the rollers and will arc therewith, especially when the rollers are rotating at very fast speeds, such that the pieces will separate from the rollers at random locations and/or travel around a complete revolution of the rollers. Thus, the speed of rotation of the rollers and the production rate of the dough ropes must be reduced to substantially eliminate such dough adherence problems. Attempts have been made to utilize blade scrapers to scrape any pieces adhering in the grooves of the rollers. However, such scrapers have a tendency to deform or otherwise damage the soft dough pieces and also require the production rate of the dough ropes to be reduced to allow movement of the dough scrapers during the rotation of the rollers.

Typically, the dough ropes are not consistently fed to the nip of the rollers such as by pneumatic conveyors but tend to travel over an axial range. Thus, it is best for the grooves in the rollers between the blades to be continuous, i.e. without interruption. Additionally, it is desired to set the rollers with zero or minimum clearance such that the pieces are consistently cut. Further, it is desired to cut the dough ropes generally perpendicular to the dough ropes to create the pillow-shaped pieces, whereas if the dough ropes were not cut generally perpendicular to the dough ropes, diamond-shaped pieces would be produced. Diamond-shaped pieces would have sharper corners than pillow-shaped pieces, with sharp corners being a safety concern especially for harder, finished cereal pieces as potentially scratching the mouth and digestive system when eaten and if not thoroughly chewed. Thus, a need has arisen for crimping/ cutting rollers which create pillow-shaped pieces without encountering the pulsating effect created in prior straight blade rollers.

SUMMARY

The present invention solves these and other problems and needs in the field of the production of pieces from continuous ropes of dough or the like by providing, in the preferred form, compressible elements located in each of the grooves defined by a plurality of blades positioned circumferentially spaced around the periphery of the cutter, with the compressible elements being compressed in the groove when the dough is being crimped and cut by the blades abutting with the anvil and expanding and forcing the longitudinally cut lengths of dough from the groove when the blades separate from the anvil.

In another aspect of the present invention, the grooves are spaced, parallel, axially continuous, and linearly straight across the periphery of a roller which is rotatable about an axis, with the lands and grooves being offset from the axis of the cutter roller at a small angle in the order of 3° such that at least a portion of one of the lands of the cutter roller engages with a portion of the anvil during all times of rotation of the cutter roller.

It is thus an object of the present invention to provide a novel device for crimping and cutting dough.

It is further an object of the present invention to provide such a novel crimping and cutting device for dough ropes.

It is further an object of the present invention to provide such a novel crimping and cutting device which does not encounter problems of adherence of the longitudinally cut dough pieces to the cutter roller.

It is further an object of the present invention to provide such a novel crimping and cutting device which does not utilize scrapers.

It is further an object of the present invention to provide such a novel crimping and cutting device which crimps and cuts dough longitudinally advancing at relatively high rates of speed in the order of 350 feet (100 meters) per minute.

It is further an object of the present invention to provide such a novel crimping and cutting device having zero or minimum clearance between the cutter and anvil rollers.

It is further an object of the present invention to provide such a novel crimping and cutting device having smooth operation and minimizing wear.

It is further an object of the present invention to provide such a novel crimping and cutting device which does not pulsate the rollers or bang the rollers together.

It is further an object of the present invention to provide such a novel crimping and cutting device producing pillow-shaped pieces without sharp corners.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 4 shows a partial, enlarged, end view of the cutter roller of the device of FIG. 1.

FIG. 5 shows a partial, enlarged, top view of the cutter roller of the device of FIG. 1.

Figure 1:
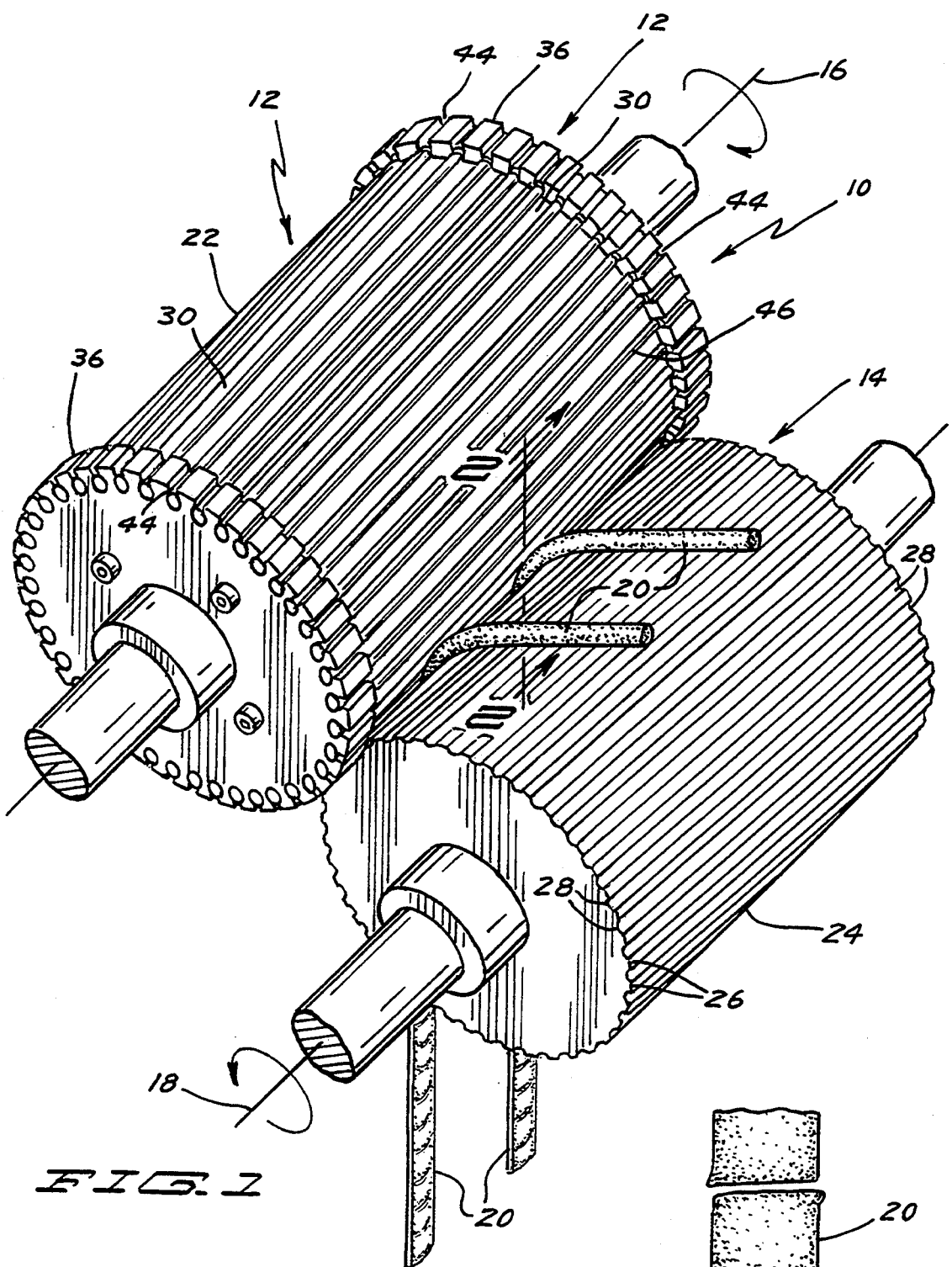
FIG. 1 shows a perspective view of a device for crimping and cutting continuous dough ropes according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "front", "back", "rear", "upper", "lower", "height", "width", "end", "side", "horizontal", "vertical", "longitudinal", and similar terms are used herein, it should be understood that these terms have reference only to the structure shown in the drawings as it would appear to a person viewing the drawings and are utilized only to facilitate describing the invention.

DESCRIPTION

Device for crimping and cutting multiple ropes of dough according to the preferred teachings of the present invention is shown in the drawings and generally designated 10. Device 10 generally includes two cutting and crimping rollers 12 and 14 having the same diameters and which have parallel horizontal axes 16 and 18, respectively, and are perpendicular to the longitudinal direction of advance of dough ropes 20. Rollers 12 and 14 are rotatable about axes 16 and 18 in opposite directions as indicated by arrows in FIG. 1. Rollers 12 and 14 each generally include peripheries 22 and 24, respectively, of equal axial length and which are in contact when rollers 12 and 14 are rotated. Roller 14 in the preferred form is located below and longitudinally forward of roller 12.

Figure 2:
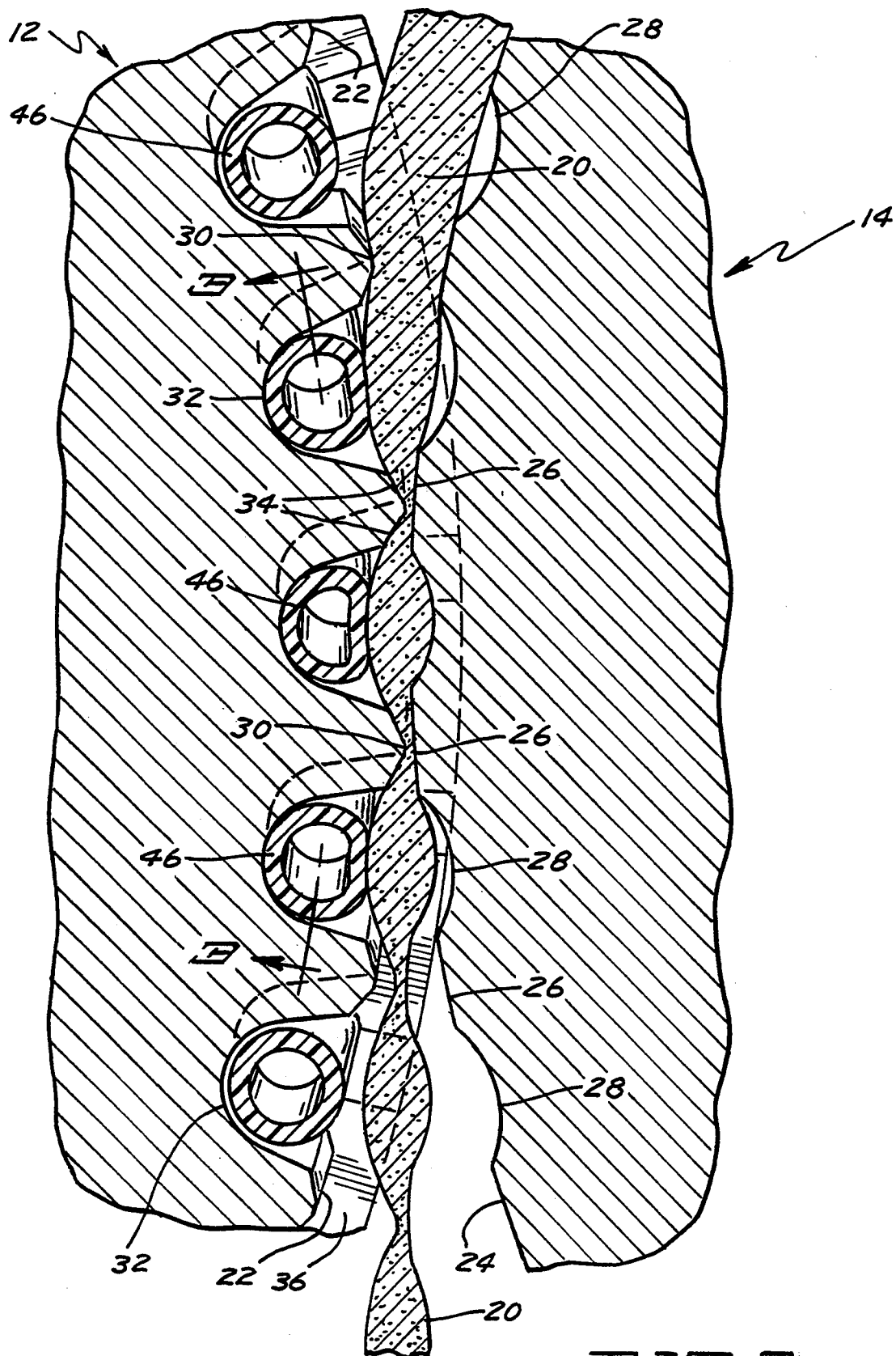
FIG. 2 shows an enlarged, cross-sectional view of the device of FIG. 1 according to section line 2—2 of FIG. 1.

As seen in FIGS. 1 and 2, periphery 24 of roller 14 is grooved and specifically includes a plurality of spaced, parallel, linearly straight lands 26 generally axially extending continuously across periphery 24 and separating, forming and defining a plurality of spaced, parallel, linearly straight grooves 28 generally axially extending continuously across periphery 24. Lands 26 are equally spaced circumferentially around periphery 24 and thus grooves 28 are also equally spaced circumferentially around periphery 24. Grooves 28 have cross sections generally in the shape of a hyperbole with the sides extending at an acute angle in the range of 78°. The circumferential distance between grooves 28 or in other words the circumferential width of lands 26 is generally equal to the circumferential width of grooves 28 at periphery 24. The depth of grooves 28 is less than one-half of their circumferential width at periphery 24 and in the most preferred form is equal to 40% of their circumferential width. In the most preferred form, roller 14 forms an anvil roller, with lands 26 having a smooth outer surface corresponding to periphery 24 for the full circumferential extent between grooves 28. Additionally, in the most preferred form, lands 26 and grooves 28 do not extend parallel to axis 18 but are offset therefrom at a small angle in the order of 3°.

Figure 3:
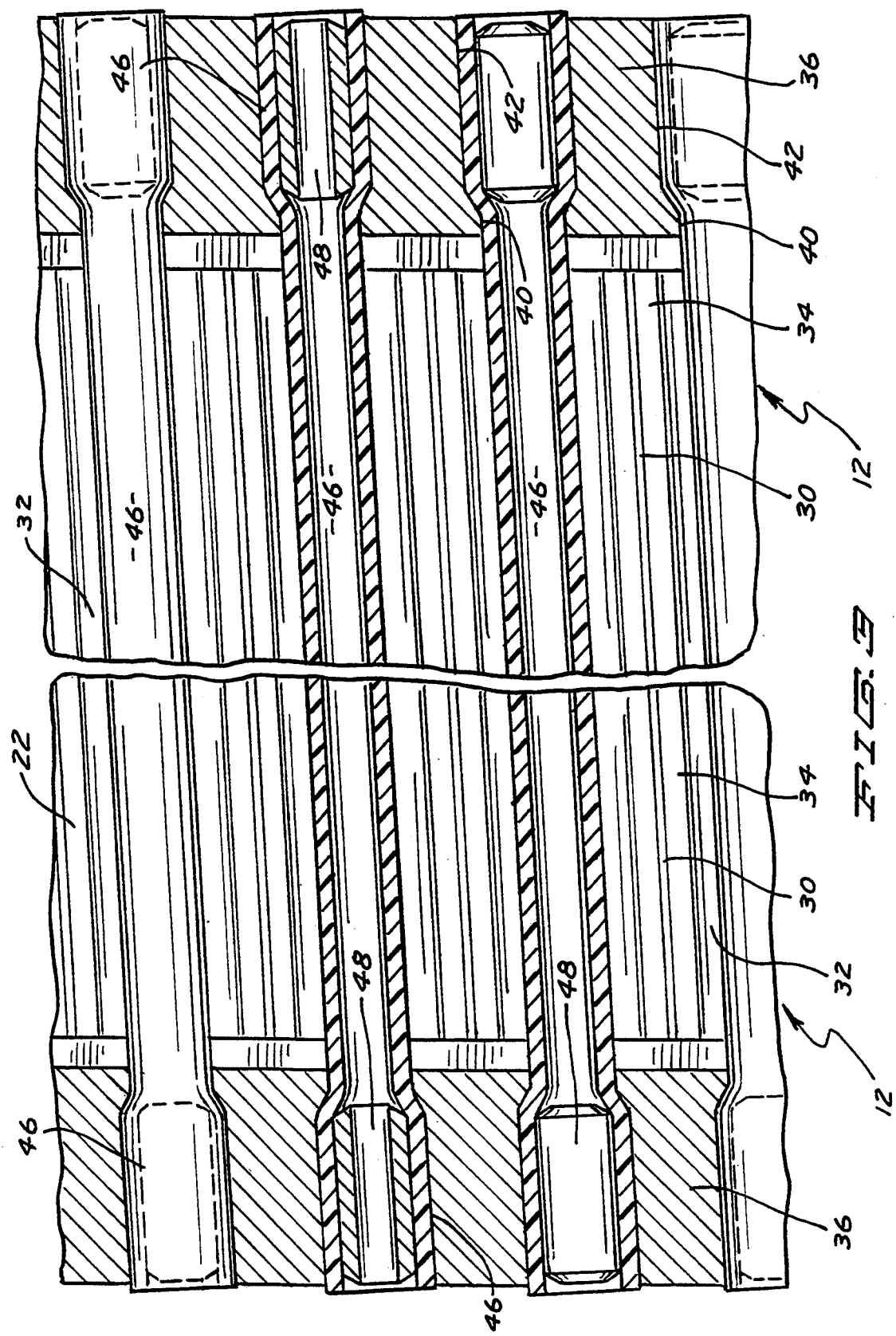
FIG. 3 shows an enlarged, cross-sectional view of the device of FIG. 1 according to section line 3—3 of FIG. 2.

As seen in FIGS. 1–3, periphery 22 of roller 12 is grooved and specifically includes a plurality of spaced, parallel, linearly straight lands 30 generally axially extending continuously across periphery 22 and separating, forming and defining a plurality of spaced, parallel, linearly straight grooves 32 generally axially extending continuously across periphery 22. Lands 30 are equally spaced circumferentially around periphery 22 and thus grooves 32 are also equally spaced circumferentially around periphery 22, with the circumferential spacing of lands 30 and grooves 32 of roller 12 corresponding to the circumferential spacing of lands 26 and grooves 28 of roller 14. Grooves 32 have cross sections generally in the shape of a hyperbole with the sides extending at an acute angle substantially smaller than the angle of the sides of grooves 28 of roller 14 and particularly in the range of 32°. The circumferential distance between grooves 32 or in other words the circumferential width of lands 30 at periphery 22 is generally equal to one-third of the circumferential width of grooves 32 at periphery 22. The depth of grooves 32 is approximately three-quarters of their circumferential width at periphery 22 and in the most preferred form is equal to 76% of their circumferential width. In the most preferred form, roller 12 forms a cutter roller, with lands 30 including first and second beveled surfaces 34 extending at an acute angle in the order of 30°, with surfaces 34 extending radially inwardly from a point spaced from the circumferential center to and intersecting with the sides of grooves 32. Lands 30 then define blades having a smooth outer surface corresponding to periphery 22 for the circumferential extent between beveled surfaces 34 which in the preferred form is generally equal to 2.3% of the circumferential width of lands 30 at periphery 22. Additionally, in the most preferred form, lands 30 and grooves 32 do not extend parallel to axis 16 but are offset therefrom at a small angle corresponding to the offset angle of lands 26 and grooves 28 of roller 14 and specifically in the order of 3°.

As seen in FIGS. 1 and 3–5, roller 12 further includes first and second circular end plates 36 secured on the opposite axial ends of roller 12 and of grooves 32. Plates 36 each have a diameter larger than roller 12 and include an outer periphery 38. Each plate 36 includes a plurality of first bores 40 spaced radially inwardly from periphery 38 and associated with each groove 32 and extending axially outward from each of the grooves 32 of roller 12. Each plate 36 includes a plurality of second bores 42 spaced radially inwardly from periphery 38 and associated with each groove 32. Bore 40 terminates in bore 42 which extends axially outward from bore 40. Bore 42 has a larger diameter than bore 40, with bores 40 and 42 intersecting between the axial ends of plates 36 with bore 40 located concentrically inward of bore 42. An axially extending channel 44 extends radially inwardly from periphery 38 to and intersecting with bores 40 and 42. Channel 44 has a width generally equal to the diameter of bore 40 and less than the diameter of bore 42. In the most preferred form, bores 40 and 42 and channel 44 do not extend parallel to axis 16 but are offset therefrom at a small angle in the order of 3° corresponding to the offset angle of grooves 32 and lands 30 of roller 12.

Device 10 further includes elongated, compressible elements or members 46 shown in the form of flexible wall tubing, which in the most preferred form is silicon tubing such as surgical tubing. Tubing 46 is positioned and removably held in each of grooves 32, with tubing 46 being axially continuous across periphery 22 of roller 12. Specifically, in the most preferred form, first and second tubular inserts 48 are provided for each tubing 46 having an outer diameter generally equal to and for slideable receipt in the inner diameter of tubing 46 with a snug fit. Inserts 48 have a length generally corresponding to bore 42. Bore 42 has a diameter for slideable receipt of the combined size of insert 48 having the end of tubing 46 slid thereon. Bore 40 has a diameter of a size for slideable receipt of tubing 46 but smaller than the combined size of insert 48 having the end of tubing 46 slid thereon and specifically prevents sliding of the combined size of insert 48 having the end of tubing 46 slid thereon therethrough. To install tubing 46 having inserts 48 slid in the opposite ends thereof in each of grooves 32, tubing 46 intermediate its end is radially slid in channel 44 of the first end plate 36 into bores 40 and 42. Tubing 46 is then pulled to slide in bores 40 and 42 until the first insert 48 with the first end of tubing 46 slid thereon is located in bore 42 of the first end plate 36. Tubing 46 is then positioned in groove 32 and the second end of tubing 46 with the second insert 48 is pulled beyond the second end plate 36. As the first end of tubing 46 is held from sliding by the first insert 48 abutting with the bore 40, tubing 46 will be stretched when the second end of tubing 46 is pulled. Tubing 46 can then be radially slid in channel 44 of the second end plate 36 into bores 40 and 42. The tension force on tubing 46 is then gradually reduced so that the length of tubing 46 decreases until the second insert 48 with the second end of tubing 46 slid thereon is located in bore 42 of the second end plate 36. Tubing 46 should still be stretched, i.e. have a length with inserts 48 received in bores 42 of end plates 36 longer than the length of tubing 46 in a static, unstretched condition separate from roller 12, and held by end plates 36 in each of grooves 32. The diameter of tubing 46 positioned in grooves 32 should be less than the depth of grooves 32, generally one-half the depth of grooves 32, and specifically in the range of 44% of the depth of grooves 32.

Figure 1A:
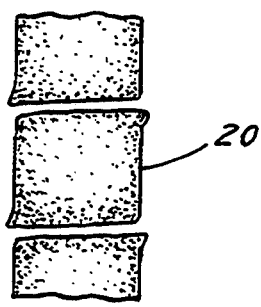
FIG. 1A shows a plan view of a crimped/cut continuous rope produced by the device of FIG. 1.

Now that the basic construction of rollers 12 and 14 of device 10 according to the preferred teachings of the present invention has been set forth, the operation of device 10 can be explained and appreciated. Specifically, rollers 12 and 14 are simultaneously rotated in opposite directions such as by spur gears, a timing belt, or the like, not shown, such that lands 30 of roller 12 abut with lands 26 of roller 14. The roll gap between peripheries 22 and 24 of rollers 12 and 14 is set to be with zero clearance in the most preferred form. The ropes of dough are fed to advance in a longitudinal direction to the nip of rollers 12 and 14, with the speed of the longitudinal advancement of the ropes of dough being at high speeds in the order of 350 feet (100 meters) per minute. Peripheries 22 and 24 are traveling in the longitudinal direction of the dough ropes at the same speed as the longitudinal advancement direction of the ropes of dough. As best seen in FIG. 2, as the dough ropes pass between the nip of rollers 12 and 14, the dough ropes are crimped and cut into longitudinal lengths corresponding to the spacing between lands 26 and between lands 30 by the abutment of lands 30 with lands 26. As the dough ropes pass between the nip of rollers 12 and 14, the dough compresses tubes 46 in grooves 32 while the dough ropes are being crimped and cut by rollers 12 and 14, with the dough and tubes 46 being sandwiched between rollers 12 and 14 and specifically within grooves 28 and 32 thereof. With the continued advancement of dough ropes and rotation of rollers 12 and 14, peripheries 22 and 24 of rollers 12 and 14 separate after the nip of rollers 12 and 14. Thus, the dough and tubes 46 are no longer sandwiched therebetween such that tubes 46 expand to their natural condition to force, expunge and remove the longitudinally cut dough from grooves 32. Additionally, the dough has less tendency to stick to tubes 46 formed of silicon or the like than roller 12 typically formed of stainless steel or the like. Thus, the dough does not have a tendency to stick or adhere to roller 12 and arc with roller 12 but will separate from roller 12 and follow periphery 24 of roller 14. It should be noted that due to the position of roller 14 below and longitudinally in front of roller 12, the trajectory of the longitudinally cut dough rope pieces will be downward even if the pieces should separate from roller 12 at random locations such that collection of such pieces is not a problem. Additionally, in the most preferred form as shown in FIG. 1A, the pieces cut remain in continuous ropes with easily fractable connections such that gravitational forces will tend to pull the pieces from grooves 28 of roller 14 and provide ease of collection of such longitudinally cut pieces.

It can then be appreciated that device 10 according to the teachings of the present invention is able to handle very high dough speeds in the range of 350 feet (100 meters) per minute without encountering adherence problems. Thus, it is not necessary that the production rate of the dough ropes be reduced to eliminate such dough adherence problems and the uniformity and consistency of the dough ropes increases with increased product output.

It should further be noted that due to the axial width of rollers 12 and 14 and the offset of lands 26 and 30 and grooves 28 and 32 from the axes 18 and 16 of rollers 14 and 12, respectively, in a helical-type arrangement, engagement of lands 26 and 30 would first occur on the first axial end of rollers 12 and 14 and would travel axially to the opposite axial end of rollers 12 and 14. However, before lands 26 and 30 would separate on the opposite axial end of rollers 12 and 14, the next, succeeding lands 26 and 30 would engage on the first axial end of rollers 12 and 14. Thus, at least a portion of one of lands 30 of cutter roller 12 engages a portion of one of lands 26 of anvil roller 14 during all times of rotation of rollers 12 and 14 and without pulsating which would occur with lands 26 and 30 parallel to axes 16 and 18. Therefore, banging of rollers 12 and 14, which would occur if lands 26 and 30 were parallel to axes 16 and 18 and grooves 28 and 32 are axially continuous is not encountered, and rollers 12 and 14 run smoother and wear better. Additionally, the individual pieces cut from the dough ropes are pillow-shaped without sharp corners as the cuts made by lands 26 and 30 are generally perpendicular to the dough ropes due to the very small offset angle of lands 26 and 30 relative to axes 16 and 18.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for crimping and cutting dough advancing in a longitudinal direction into longitudinal lengths comprising, in combination: a cutter having a periphery including a plurality of blades, with the blades being circumferentially spaced around the periphery of the cutter and defining a plurality of grooves circumferentially spaced around the periphery; an anvil, with at least one of the blades of the cutter abutting with the anvil to crimp and cut the dough therebetween while the remaining blades of the cutter are spaced from the anvil; and means for removing the dough from the grooves of the cutter after the dough has been crimped and cut by the blades comprising a compressible element located in each of the grooves of the cutter, with each compressible element being compressible inside the groove from a natural condition to a compressed condition with the dough compressing the compressible element in the groove to the compressed condition when the dough is being crimped and cut by the blades abutting with the anvil and with the compressible element expanding to the natural condition and forcing the longitudinally cut lengths of dough from the groove when the blades separate from the anvil.

2. The device of claim 1 wherein the anvil comprises a roller having a periphery and rotatable about an axis such that the periphery of the anvil roller travels in the longitudinal direction of the dough, with the blades abutting with the periphery of the anvil roller to crimp and cut the dough therebetween.

3. The device of claim 2 wherein the anvil roller includes a plurality of lands, with the lands being circumferentially spaced around the periphery of the anvil roller corresponding to the circumferential spacing of the blades around the periphery of the cutter, with the lands of the anvil roller defining a plurality of grooves circumferentially spaced around the periphery of the anvil roller.

4. The device of claim 3 wherein the blades of the cutter are equally circumferentially spaced around the periphery of the cutter.

5. The device of claim 4 wherein the grooves of the cutter are axially continuous across the periphery of the cutter; and wherein the compressible elements are axially continuous across the periphery of the cutter.

6. The device of claim 5 wherein each of the compressible elements comprise a tube.

7. The device of claim 6 wherein the cutter further includes first and second end plates located on opposite axial ends of the grooves; wherein the tubes are stretched between and held by the end plates in each of the grooves.

8. The device of claim 7 wherein each of the end plates includes a plurality of first and second bores, with the first bore axially extending outwardly from each of the grooves of the cutter and terminating in the second bore axially extending outwardly from the first bore, with the first bore being of a size for slideable receipt of the tube and with the second bore being of a size larger than the first bore; and wherein the device further comprises, in combination: first and second inserts for each of the tubes, with each of the tubes having an inner diameter, with the inserts being slideable in the inner diameter of the tube to increase the size of the tube to be larger than the first bore and for slideable receipt in the second bore.

9. The device of claim 7 wherein the cutter comprises a roller rotatable about an axis parallel to and spaced from the axis of the anvil roller and rotatable in a direction opposite to the rotation direction of the anvil roller such that the periphery of the cutter roller travels in the longitudinal direction of the dough.

10. The device of claim 9 wherein the blades and grooves of the cutter roller and the lands and grooves of the anvil roller are continuous and linearly straight and are offset from the axes of the rollers at a small angle on the order of 3° such that a portion of one of the blades engages with a portion of one of the lands during all times of rotation of the cutter and anvil rollers.

11. The device of claim 1 wherein the cutter comprises a roller rotatable about an axis and rotatable in a direction such that the periphery of the cutter roller travels in the longitudinal direction of the dough.

12. The device of claim 11 wherein the blades and grooves of the cutter roller are continuous and linearly straight and are offset from the axis of the cutter roller at a small angle on the order of 3° such that a portion of one of the blades engages with a portion of the anvil during all times of rotation of the cutter roller.

13. The device of claim 11 wherein the grooves of the cutter are axially continuous across the periphery of the cutter; and wherein the compressible elements are axially continuous across the periphery of the cutter.

14. The device of claim 1 wherein the grooves of the cutter are axially continuous across the periphery of the cutter; and wherein the compressible elements are axially continuous across the periphery of the cutter.

15. The device of claim 14 wherein each of the compressible elements comprise a tube.

16. The device of claim 15 wherein the cutter further includes first and second end plates located on opposite axial ends of the grooves; wherein the tubes are stretched between and held by the end plates in each of the grooves.

17. The device of claim 16 wherein each of the end plates includes a plurality of first and second bores, with the first bore axially extending outwardly from each of the grooves of the cutter and terminating in the second bore axially extending outwardly from the first bore, with the first bore being of a size for slideable receipt of the tube and with the second bore being of a size larger than the first bore; and wherein the device further comprises, in combination: first and second inserts for each of the tubes, with each of the tubes having an inner diameter, with the inserts being slideable in the inner diameter of the tube to increase the size of the tube to be larger than the first bore and for slideable receipt in the second bore.

18. Device for crimping and cutting dough advancing in a longitudinal direction into longitudinal lengths comprising, in combination: a cutter roller having a periphery including a plurality of spaced, parallel, continuous, linearly straight lands separating, forming, and defining a plurality of spaced, parallel, continuous, linearly straight grooves, with the cutter roller being rotatable about an axis such that the periphery of the cutter roller travels in the longitudinal direction of the dough; and an anvil, with the lands and the grooves of the cutter roller being offset from the axis of the cutter roller at a small angle on the order of 3° such that a portion of one of the lands of the cutter roller engages with a portion of the anvil during all times of rotation of the cutter roller.

19. The device of claim 18 wherein the anvil comprises a roller rotatable about an axis parallel to and spaced from the axis of the cutter roller and rotatable in a direction opposite to the rotation direction of the cutter roller such that the periphery of the anvil roller travels in the longitudinal direction of the dough.

20. The device of claim 19 wherein the anvil roller includes a plurality of lands, with the lands being circumferentially spaced around the periphery of the anvil roller corresponding to the circumferential spacing of the lands around the periphery of the cutter roller, with the lands of the anvil roller defining a plurality of grooves circumferentially spaced around the periphery of the anvil roller, with the lands and the grooves of the anvil roller being offset from the axis of the anvil roller at a small angle corresponding to the offset angle of the lands and the grooves of the cutter roller such that a portion of one of the lands of the cutter roller engages with a portion of one of the lands of the anvil roller during all times of rotation of the cutter and anvil rollers.

* * * * *